United States Patent Office 3,255,208
Patented June 7, 1966

---

3,255,208
DIMETHYL-β-PROPIOTHETIN AND RELATED COMPOUNDS
Eugéne L. Leroi, Paris, France, assignor to Societe Civile de Recherches et d'Applications Scientifiques, Issy-les-Moulineaux, France, a corporation of France
No Drawing. Filed Apr. 5, 1963, Ser. No. 271,838
Claims priority, application Great Britain, Jan. 23, 1961, 2,676/61; Switzerland, Jan. 18, 1962, 601/62
1 Claim. (Cl. 260—327)

This application is a continuation-in-part of application Serial No. 168,028, filed January 19, 1962, now abandoned.

This invention relates to certain specific derivatives of dimethylcarboxy-alkylsulfonium.

Dimethylthetin (dimethylcarboxymethylsulfonium, dimethyl-2,2-dihydro-1,2-oxathietan-4-one or dimethylacetothetin), a base having the formula:

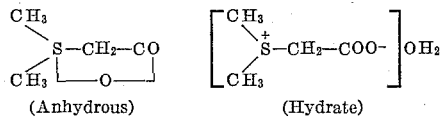

(Anhydrous)  (Hydrate)

and dimethyl-β-propriothetin, a base having the formula:

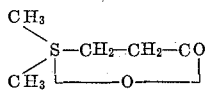

are known to have a lipotropic action.

However, the therapeutic use of the above cited bases has always come up against a major practical difficulty; that is the tendency of these compounds to break down, with attendant formation of small quantities of methyl sulfide, a toxic substance of very unpleasant smell and taste. This spontaneous decomposition occurs:
  With the bases themselves, and
  With their highly ionized acid salts, such as for instance, hydrochloric, hydrobromic, sulfuric. Moreover, due to their strong acidic properties, these salts are very irritant and cannot be tolerated by the organism, which is another drawback added to decomposition.

The decomposition of the base occurs even when unusual and unpractical precautions are taken in storage, such as storage under an atmosphere controlled for its oxygen, nitrogen and inert gas contents, moisture and temperature, or on thorough desiccation or storage in vacuo or in freeze, and so on.

Therefore, for the reasons herein above stated, these bases and their inorganic salts could not be incorporated in usual pharmaceutical compositions.

The present invention sets out to overcome this difficulty, and to provide derivatives of dimethylcarboxy-alkylsulfonium, which are sufficiently stable to be of practical use in various medicinal compositions.

The inventor has found out that, in combining the base dimethylthetin with an organic acid, preferably having a pK value in the range from 3 to 6, and, more particularly, with those organic acids having a pK in the range from 4 to 5, it was possible to obtain stable and therapeutically acceptable compositions.

In carrying out the invention, it is frequently advantageous to use organic acids whose molecules possess some functions, such as $NH_2$ or OH groups or a double bond, capable of imparting to the molecule a tendency to enter into complexes, which apparently enhances the stability of the pharmaceutical compositions of the invention.

Of course, the stability is increased when the compounds obtained are poorly or very poorly soluble in water.

As a consequence the present invention relates to stable salts derived from dimethyl-carboxy-alkyl sulfonium having the formula:

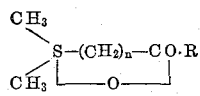

where:

$n$ is an integer selected from within 1 and 2
R is an organic acid selected from the group consisting of ascorbic acid, p-aminobenzoic acid, fumaric acid, malic acid, salicylic acid and 3-hydroxy 2-napthtoic acid.

The compounds obtained according to the invention have been exposed to prolonged storage tests including tests under conditions generally recognized as unfavourable, and have been found consistently to exhibit a very low rate of decomposition, and have even been found to present no biologically or chemically detectable alteration, when tested for $S(CH_3)_2$ content.

These compounds may therefore be used in biological experimentation without there being introduced any additional toxicity that would render the results of toxicity tests erroneous or unreliable, and without having to use extemporaneously prepared dimethylthetin.

It has been found that the derivatives of dimethylthetin and its homolog, prepared according to the invention, were easily applicable in animal therapy, and were very efficient especially in the treatment of hypercholesterol-emia. Furthermore, these compounds are carriers of organic sulfur and, as such, can be advantageously used in any diseases susceptible to sulfur therapy.

These novel compounds can be embodied in various conventional pharmaceutical forms, and may constitute the sole active ingredient therein or may be combined with other active principles. Those of the compounds that have good water solubility can be injected parenterally.

Generally speaking, the organic acid salts of dimethyl-thetin according to the invention are applicable orally, parenterally and/or rectally.

It will be understood that in many cases it may be advisable to use, as the organic acid combined with dimethyl-thetin according to the process of the invention, an acid which, per se, may possess some desirable therapeutic property, whereby the therapeutic utility of the base may be enhanced without impairing the specific activity of the base. Thus, ascorbic acid is one such acid having especial interest.

The salts of the invention may conveniently be prepared by reacting the organic acid with the free dimethylthetin base, in a solvent medium selected in accordance with the solubility characteristics of the reagents used. The more usual solvents are water and alcohols.

It is necessary, in the preparation process, to avoid excessive temperature elevations. Moreover the temperature should advantageously be held below 30 to 40° C.

during the process of separation of the salt from the mother-liquor, especially if the solvent is being removed by distillation.

The salts of the invention can be recrystallized and purified by the usual techniques, using solvents such as alcohols, benzene, chlorinated solvents or water, according as the product salt is soluble in any of these solvents.

The organic acid salts of the invention may be neutral or acidic salts as the case may be. Neutral or acidic salts have been isolated by reacting appropriate dicarboxylated organic acids with the dimethylthetin.

The invention will now be further described with reference to exemplary procedures given by way of illustration but not of limitation.

EXAMPLE 1

68.56 g. p-aminobenzoic acid (4 amino benzoic acid, pK 4.65) were dissolved in 550 cc. absolute alcohol and to the solution was added, with constant stirring, a solution of 60 g. dimethylthetin base in 250 cc. absolute alcohol.

During the operation part of the salt precipitated immediately and was collected. The remaining alcohol solution was concentrated by distilling in vacuo part of the solvent, and on cooling released an additional amount of salt. The resulting product was purified by recrystallization from ethyl alcohol and had a melting point of 142–144° C. Its composition was that of dimethylthetin para-aminobenzoate, it was highly soluble in methyl alcohol, soluble in ethyl alcohol, sparingly soluble in water. The compound is practically odourless.

EXAMPLE 2

To 134 g. β-propiothetin base dissolved in 500 cc. absolute ethyl alcohol were added 176 g. l-ascorbic acid suspended in 500 cc. water, at ordinary temperature and with stirring. The resulting homogeneous solution was concentrated to dry condition in vacuo at a temperature of about 30° C. The crystalline mass was dissolved in a minimum volume of methanol at boiling point. After filtration and cooling to 0° C., the crude product was found to be obtained with a 70% yield. The product could be purified by recrystallization from methanol. The salt melts at 97–100° C., is highly soluble in water, soluble in ethyl alcohol and soluble in methanol at elevated temperature.

EXAMPLE 3

Using operating procedures similar to those in Examples 1 and 2, the following dimethylthetin derivatives were prepared:

Dimethylthetin acidic fumarate (lower pK of fumaric acid 3.02), this is very soluble in methyl and ethyl alcohols, rather sparingly soluble in water. Its melting point is 154–156° C.

Dimethylthetin salicylate (pK 3.0), highly soluble in methyl and ethyl alcohols, soluble in chloroform and benzene, very sparingly soluble in water. M.P. 102–104° C.

Dimethylthetin acid malate, very hygroscopic highly soluble in water, sparingly soluble in ethanol.

Dimethylthetin 3-hydroxy 2-naphtoate, sparingly soluble in water, more soluble in ethanol where it crystallizes by cooling, very sparingly soluble in ethylic ether. M.P. 125–127° C.

Dimethylthetin dihydrogen citrate (lower pK of citric acid 3.13) or dimethylthetin monocitrate. Highly soluble in water, soluble in ethyl alcohol. M.P. 115° C.

The compounds of the invention were subjected to various pharmacological tests, especially with regard to toxicity, action on content of cholesterol in blood and liver.

Thus for dimethylthetin l-ascorbate the acute toxicity $LD_{50}$ value for intraperitoneal injection was found to be 4.2 g./kg. in the rate, 4.0 g./kg. in the mouse and 4.0 g./kg. in the rabbit. Subcutaneously the $LD_{50}$ value was 5.0 g./kg. in the rate, and intravenously it was 3.6 g./kg. in the rabbit. Per os, 8 g./kg. administered to rats resulted in no mortality.

The subacute toxicity was tested by treating the animals (rats, mice, rabbits) for four consecutive days and continuing observations over the five following days. It was found that in the rat and mouse, doses of 3.0 g./kg. given subcutaneously are very well tolerated, in the rabbit 2.50 g./kg. doses similarly applied are very well tolerated.

Administered orally for 21 days, 1.50 g./kg. doses were very well tolerated by the rat and mouse. Such prolonged treatment did not result in any alteration in the behaviour and proved to be compatible with normal growth of the test animals.

For dimethylthetin p-aminobenzoate, the $LD_{50}$ value by oral administration was 4.3 g./kg. in the mouse. Given orally doses of 200 mg./kg. for 21 days were well tolerated.

Contrary to cerain compounds already known for their lipotropic action, the salts of dimethylthetin according to the invention exert an action on the cholesterol content of the blood and the liver. This specific action has been demonstrated in the rat and the chicken by various classical tests.

In the *adult male rat* (Long-Evans) the intravenous injection of Triton WR–1339 (a polymer of polyoxyethylenephenol) at doses of 200–300 mg./kg. provokes the appearance of an experimental hypercholesterolemia. Simultaneous intraperitoneal administration of dimethylthetin or one of its organic salts, such as its ascorbate, appreciably reduces the quantity of blood cholesterol with respect to that of control animals.

Thus in the normal rat, the total cholesterol content was 0.80 g. percent; eight hours after intravenous injection of 250 mg./kg. of Triton WR–1339 it amounted to 1.61 g. percent and fell to 1.10 g. percent when, at the same time as the Triton WR–1339, 1 g./kg. of dimethylacetothetin or 2.5 g./kg. of its ascorbate was injected intraperitoneally. Under the same conditions, but 18 hours after commencement of the experiment, the amount of cholesterol was 0.75 g. percent in control rats; it amounted to 1.95 g. percent in rats treated with Triton WR–1339 alone and fell to 1.32 g. percent in animals treated with dimethylthetin or its ascorbate.

It was confirmed that this action was repeated in the liver of Whistar rats subjected to an experimental diet super-abundant in cholesterol identical with that used by Vahouny G. C., Flick D. F., Georgian H. M., Treadwell C. R. (Nutrition Studies in the Cold, III, Effects of Cold Environment on "Cholesterol" Fatty Livers, J. of Nutrition, 1951, 68, No. 3, 495–507.)

The animals were sacrificed after experiments lasting 21 days and, on the excised livers, the fatty and total cholesterol contents were assessed.

In animals subjected to the diet rich in cholesterol, the total fatty content amounted to 44.0% of the dry liver and that of cholesterol to 12.15%. In animals which had been given a daily buccal dose of 1 g./kg. of dimethylthetin ascorbate, these amounts fell respectively to 29.6% (total fats) and 7.2% (total cholesterol). Practically identical results were obtained by the daily administration per os of 0.500 g./kg. of basic dimethylthetin.

Histological examination of the livers clearly confirmed the results of these chemical assessments.

The results were confirmed by studies on young Leghorn cocks subjected, for 41 days, to a diet consisting of a commercial feed mixture to which 1% of cholesterol and 5% of corn oil had been added.

A batch of 20 cockerels also received orally 2.5 g./kg. of dimethylthetin ascorbate.

After 21 days, the cholesterol content of the blood was as follows:

|  | Grams percent |
|---|---|
| Normal feeding | 0.94 |
| Hypercholesterolic diet | 4.58 |
| Hypercholesterolic diet+dimethylthetin ascorbate | 2.90 |

The results obtained after experimenting for 41 days are grouped in Table I.

Table I

|  | Total Cholesterol (blood serum), g. percent | Total lipide (blood serum), g. percent | Phospholipids (blood serum), g. percent |
|---|---|---|---|
| Normal feeding | 1.22 | 3.56 | 0.73 |
| Hypercholesterolic diet | 6.00 | 10.16 | 1.15 |
| Hypercholesterolic diet + dimethylthetin ascorbate | 4.00 | 6.90 | 0.84 |

In addition, the diet rich in cholesterol provoked the formation of very important aortic atheromes in 85% of the animals. In the animals treated, the frequency of these atheromes was 40%, and in both macroscopic and histological examination, the majority of them only constituted lesions of medium or small importance.

On the cockerels not sacrificed at the end of 41 days and then fed only with a normally balanced commercial diet, it was observed in the animals treated with dimethylthetin ascorbate that there was very rapid regression of the atheromatic lesions, which was not the case in animals not treated with this product.

From this series of experimental factors, it was concluded that dimethylthetin and certain of its salts, particularly those of the present invention, have on the animal a very clear action on the high cholesterol content of the blood and the liver as well as on the regression of atheromes resulting from the ingestion of hypercholesterolemic diets.

The progress represented by the present invention will be better appreciated if it is noted that:

Up to the present, no stable and therapeutically acceptable form of dimethylacetothetin nor of dimethylpropiothetin had ever been perfected.

These two bases, as well as their salts with the acids defined above, have shown that they have an important activity, a priori unforeseeable, as anticholesterol agents and this property could not be exploited so long as therapeutically acceptable and sufficiently stable forms were unknown.

What I claim is:

A stable addition salt of dimethyl-carboxy alkyl sulfonium having the formula:

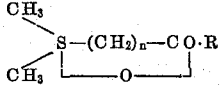

where:

$n$ is an integer selected from within 1 and 2

R is an organic acid selected from the group consisting of ascorbic acid, p-aminobenzoic acid, fumaric acid, malic acid, salicylic acid, and 3-hydroxy 2-naphtoic acid.

References Cited by the Examiner

UNITED STATES PATENTS

| 2,178,353 | 10/1939 | Werntz | 260—327 |
| 2,602,801 | 7/1952 | Roha | 260—327 |
| 2,794,045 | 5/1957 | Beaufour et al. | 260—501 |
| 3,002,886 | 10/1961 | Halpern | 260—501 |

OTHER REFERENCES

Burger: Medicinal Chemistry, 2nd ed., Intersci. Pub., New York (1960), page 658.

Challenger et al.: Chemical Abstracts, vol. 51 (1957), page 18154.

Durell et al.: Biochem. et Biophys. Acta, vol. 26 (1957), pages 270–286.

Lange's Handbook of Chemistry, Handbook Publishers, Inc., Sandusky, Ohio, 9th ed. (1956), page 1202.

Leaver et al.: J. Chem. Soc. (1957), pages 39–46.

JOHN D. RANDOLPH, *Acting Primary Examiner.*

WALTER A. MODANCE, *Examiner.*

JAMES A. PATTEN, *Assistant Examiner.*